(12) United States Patent
Pratt et al.

(10) Patent No.: US 9,325,436 B2
(45) Date of Patent: Apr. 26, 2016

(54) SYSTEMS AND METHODS FOR ADAPTIVE POLARIZATION TRANSMISSION

(71) Applicant: Georgia Tech Research Corporation, Atlanta, GA (US)

(72) Inventors: Thomas G. Pratt, Covington, GA (US); Brett T. Walkenhorst, Douglasville, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 34 days.

(21) Appl. No.: 14/101,821

(22) Filed: Dec. 10, 2013

(65) Prior Publication Data

US 2014/0169428 A1    Jun. 19, 2014

Related U.S. Application Data

(63) Continuation of application No. 12/525,297, filed as application No. PCT/US2008/052447 on Jan. 30, 2008, now Pat. No. 8,605,703.

(60) Provisional application No. 60/887,201, filed on Jan. 30, 2007, provisional application No. 60/887,221, filed on Jan. 30, 2007.

(51) Int. Cl.

| | |
|---|---|
| H04B 7/216 | (2006.01) |
| H04B 7/212 | (2006.01) |
| H04B 17/00 | (2015.01) |
| H04L 27/38 | (2006.01) |
| H04B 7/04 | (2006.01) |
| H04B 17/10 | (2015.01) |
| H04B 7/10 | (2006.01) |

(52) U.S. Cl.
CPC ............ *H04B 17/003* (2013.01); *H04B 7/0413* (2013.01); *H04B 17/101* (2015.01); *H04L 27/38* (2013.01); *H04B 7/10* (2013.01)

(58) Field of Classification Search
None
See application file for complete search history.

(56) References Cited

U.S. PATENT DOCUMENTS

| | | | |
|---|---|---|---|
| 6,411,824 B1 * | 6/2002 | Eidson | ..................... H04B 7/10 342/361 |
| 6,963,619 B1 * | 11/2005 | Gesbert et al. | ................ 375/267 |
| 7,310,379 B2 | 12/2007 | Sibecas et al. | |
| 7,339,988 B1 * | 3/2008 | Shanbhag et al. | ............ 375/232 |

(Continued)

*Primary Examiner* — Kenny Lin
(74) *Attorney, Agent, or Firm* — Troutman Sanders LLP; Ryan A. Schneider; Mark Lehi Jones

(57) ABSTRACT

The present invention describes methods and apparatus for adaptive polarization transmission. An exemplary embodiment of the present invention provides an adaptive polarization transmission method. The method includes the step of analyzing at a transmitter device a first set of polarization state information relating to a first wireless signal path. Furthermore, the method includes the step of adapting a transmission signal to be distributed by the transmitter device based on at least the first set of polarization state information. In addition to adaptive polarization transmission methods, the present invention provides various adaptive polarization transmission systems. In an exemplary embodiment, an adaptive polarization transmission system includes a transmitter device. The transmitter device includes an analyzing unit for processing a first set of polarization state information relating to a first wireless signal path. Furthermore, the transmitter device includes an adapting unit for adapting a transmission signal to be distributed by the transmitter device based on at least the first set polarization state information.

34 Claims, 8 Drawing Sheets

(56) References Cited

U.S. PATENT DOCUMENTS

| | | | |
|---|---|---|---|
| 8,306,473 B2* | 11/2012 | Anreddy et al. | 455/39 |
| 2002/0012493 A1* | 1/2002 | Newell et al. | 385/24 |
| 2008/0188190 A1* | 8/2008 | Prasad | H04B 7/0617 455/114.3 |
| 2009/0197544 A1* | 8/2009 | Petersson | H04B 7/10 455/73 |

* cited by examiner

SYSTEMS AND METHODS FOR ADAPTIVE POLARIZATION TRANSMISSION

CROSS-REFERENCE TO RELATED APPLICATIONS

This application is a continuation of U.S. application Ser. No. 12/525,297 filed 30 Jul. 2009, which is a 35 U.S.C. §371 U.S. National Stage of International Application No. PCT/US2008/052447 filed 30 Jan. 2008, which claims the benefit of U.S. Provisional Patent Application Nos. 60/887,201 and 60/887,221, both filed 30 Jan. 2007, the entire contents and substance of which are hereby incorporated by reference in their entireties as if fully set forth below.

STATEMENT REGARDING FEDERALLY SPONSORED RESEARCH OR DEVELOPMENT

This invention was made with United States Government support in the Communications and Networks Consortium sponsored by the United States Army Research Laboratory under the Collaborative Technology Alliance Program, Cooperative Agreement No. DADD19-01-2-0011. The Government has certain rights in this Invention.

FIELD OF THE INVENTION

This invention relates generally to the field of wireless signal transmission adaptation, and specifically to systems and methods to efficiently and effectively adapt the polarization state of a transmitted signal for wireless communications.

BACKGROUND OF THE INVENTION

Wireless telecommunications capabilities have grown tremendously in recent years, and wireless device use has permeated into almost every sector of business and daily activity. As wireless communication expands, the demands placed upon the reliability of wireless technology increase. Accordingly, the complexity of wireless technology has grown exponentially. Wireless communications networks operate at ever-increasing bandwidths and over broadening frequency ranges. For example, in cellular networks Specialized Mobile Radio Service (SMR) can be implemented in the 800 MHz band or 900 MHz band and Personal Cellular Service (PCS) can operate in the 1900 Mhz band. Additionally, wireless local area network (WLAN) communication operates over high frequency bands, such as the 2.4 GHz and 5 GHz public spectrum bands for IEEE 802.11 Standards. Signaling bandwidths are also increasing to enable higher data rate applications.

These wireless communication networks are subject to a number of RF propagation impairments that increase in scale as the transmission bandwidths increase. One significant problem in wireless communication is due to the detrimental effects of polarization shifting on a wireless transmission signal. Propagation problems can include interference with multipath reflections off nearby objects. Furthermore, many transmit and receive sites for wireless communication devices are not in a direct line-of-sight (LOS). As such, wireless signals are subject to significant degradation due to polarization mode dispersion effects. These detrimental effects are increasingly present in high frequency implementations.

Discussion in the prior art regarding polarization behavior has been focused on diversity gain, polarization component delay and loss, and depolarization effects. Some prior art wireless telecommunication systems have attempted to implement polarization diversity architectures to combat the detrimental effects of polarization-sensitive fading. Some prior art systems rely upon limited cross-polarization discrimination techniques to attempt to characterize the polarization effects in a particular channel. Additionally, some prior art systems have relied upon calculations of delay spread and path loss in attempt to accurately characterize polarization-based channel impairments.

Conventional prior art wireless communication systems have been unable to accurately adapt to model polarization impairments over a wireless signal path particularly when the multipath delay-bandwidth product is sufficient to induce polarization mode dispersion, which is a spread of the signal polarization state as a function of frequency. Accordingly, conventional prior art wireless communication systems have been unable to efficiently and effectively reduce the degradation in signal reception caused by polarization mode dispersion and polarization dependent loss. Therefore, it would be advantageous to provide an apparatus and method of adaptive polarization transmission to reduce the impact of polarization mode dispersion.

Additionally, it would be advantageous to provide an apparatus and method for efficiently and effectively reducing deleterious effects from polarization impairments on a wireless transmission signal.

Additionally, it would be advantageous to provide an apparatus and method for estimating an adaptive polarization response for the transmission of a signal through a polarization-impaired wireless transmission signal path.

Additionally, it would be advantageous to provide an apparatus and method to mitigate polarization dependent loss.

BRIEF SUMMARY OF THE INVENTION

The present invention describes methods and apparatus for adaptive polarization transmission. An exemplary embodiment of the present invention provides an adaptive polarization transmission method. The method includes the step of analyzing at a transmitter device a first set of polarization state information relating to a first wireless signal path. Furthermore, the method includes the step of adapting a transmission signal to be distributed by the transmitter device based on at least the first set of polarization state information.

In addition to adaptive polarization transmission methods, the present invention provides various adaptive polarization transmission systems. In an exemplary embodiment, an adaptive polarization transmission system includes a transmitter device. The transmitter device includes an analyzing unit for processing a first set of polarization state information relating to a first wireless signal path. Furthermore, the transmitter device includes an adapting unit for adapting a transmission signal to be distributed by the transmitter device based on at least the first set polarization state information.

These and other objects, features and advantages of the present invention will become more apparent upon reading the following specification in conjunction with the accompanying drawing figures.

DETAILED DESCRIPTION OF PREFERRED EMBODIMENTS

Figure 1:
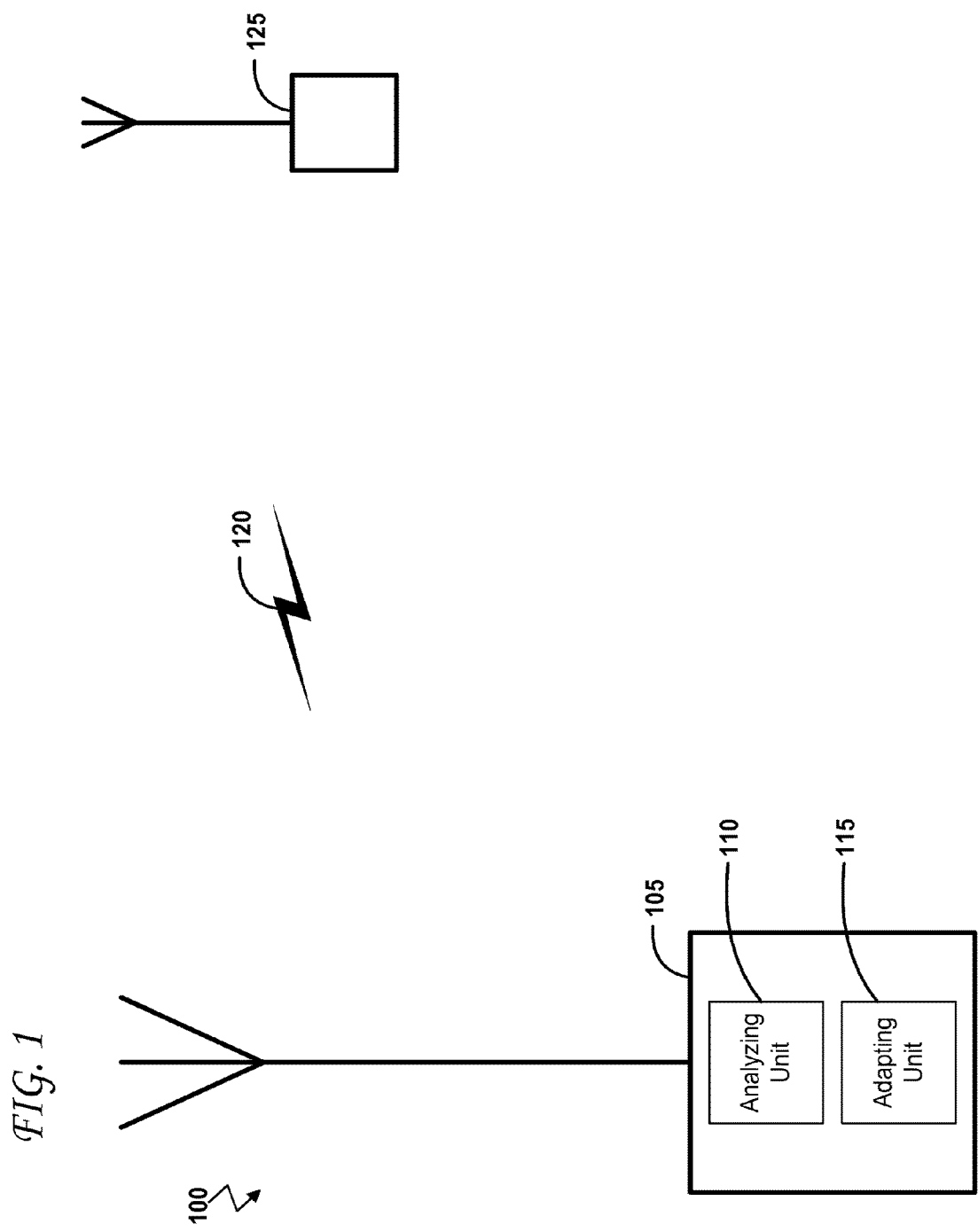
FIG. 1 provides an illustration of a block diagram of the adaptive polarization transmission system 100 in accordance with an exemplary embodiment of the present invention.

The present invention addresses the drawbacks of conventional systems and methods of optimizing the transmission and reception of wireless signals. Significantly, the present invention provides methods and apparatus for efficient and effective adaptation of the polarization state of a wireless signal. A transmitter device provided in accordance with the present invention is enabled to accurately adapt transmitted signals for optimized reception. Additionally, the present invention offers many advantages over the systems and methods of the prior art by enabling a transmitter device to compensate for polarization mode dispersion and polarization dependent loss.

In an exemplary embodiment, the present invention provides an adaptive polarization transmission method. The method includes the step of analyzing at a transmitter device a first set of polarization state information relating to a first wireless signal path. Furthermore, the method includes the step of adapting a transmission signal to be distributed by the transmitter device based on at least the first set of polarization state information.

In addition to adaptive polarization transmission methods, the present invention provides various adaptive polarization transmission systems. In an exemplary embodiment, an adaptive polarization transmission system includes a transmitter device. The transmitter device includes an analyzing unit for processing a first set of polarization state information relating to a first wireless signal path. Furthermore, the transmitter device includes an adapting unit for adapting a transmission signal to be distributed by the transmitter device based on at least the first set polarization state information.

The systems and methods of the present invention provide many advantages over the prior art. While many prior art systems are capable of adapting wireless transmission signals according to channel state information, none adapt the polarization of a wireless transmission signals to reduce or minimize polarization mode dispersion and polarization dependent loss. Therefore, prior art transmission networks are subject to the degradation and loss associated with the polarization of transmitted wireless signals. More particularly, a purely polarized signal distributed by a prior art wireless communication system will exhibit polarization spread versus frequency at the output of the channel with signal power at levels that are a function of the transmitted polarization.

An exemplary embodiment of the present invention provides an adaptive polarization transmission system 100 that enables the prediction of the output dispersion patterns on the Poincare sphere as a function of input polarization state and signal bandwidth. The ability to predict the output dispersion patterns can enable the compensation for, or correction of, polarization mode dispersion and polarization dependent loss.

The term "transmitter device" is used herein to refer to a device enabled to transmit electromagnetic signals. The transmitter device may or may not have additional capabilities, such as the ability to receive electromagnetic signals. The term "remote terminal device" is used herein to generally refer to a device enabled to receive electromagnetic signals. Additionally, the remote terminal device may or may not have additional capabilities, such as the ability to transmit electromagnetic signals or communicate with a transmitter device. The term "polarization state information" is used herein to describe any and all information relating to polarization-based effects acting upon a signal from its transmission to its reception.

FIG. 1 provides an illustration of a block diagram of the adaptive polarization transmission system 100 in accordance with an exemplary embodiment of the present invention. As shown in FIG. 1, the adaptive polarization transmission system 100 can include a transmitter device 105 in an exemplary embodiment. In an exemplary embodiment, the transmitter device 105 includes an analyzing unit 110. The analyzing unit 110 is enabled to process a first set of polarization state information relating to a first wireless signal path 120. In an exemplary embodiment, the first wireless signal path 120 can correspond to the signal path between the transmitter device 105 and a remote terminal device 125. Therefore, the analyzing unit 110 of the transmitter device 105 can receive and process a first data set of polarization state information providing information about the polarization effects experienced by a wireless transmission signal propagating over the first wireless signal path 120. Additionally, the transmitter device 105 can include an adapting unit 115 enabled to adapt a transmission signal to be distributed by the transmitter device 105 based on at least the first set polarization state information processed by the analyzing unit.

In an exemplary embodiment, the transmission signal can be modified by adapting unit 115 to control the polarization mode dispersion experienced by the transmitted signal. Compensating for the polarization mode dispersion incurred during propagation over the first wireless signal path 120 can enable numerous advantages, such as signal power maximization and/or minimization with or without dispersion and control over the received signal subband polarization state. In addition to enabling a reduction in polarization mode dispersion, the adapting unit 115 can modify the transmission signal to reduce or minimize polarization dependent loss.

Those of skill in the art will appreciate that first set of polarization state information relied on by the adaptive polarization transmission system 100 can be provided from a variety of different sources. For example, and not limitation, polarization state information can be provided to the transmitter device 105. In one embodiment, the transmitter device 105 can receive the polarization state information from the remote terminal device 125. In this embodiment, the remote terminal device 125 is enabled to perform the calculations to estimate the polarization state information of the relevant wireless signal path and communicate that polarization state information to the transmitter device 105. The polarization state information can be communicated from the remote terminal device 125 to the transmitter device 105 in variety of different ways, including over a dedicated hard wired communication link, over a wireless communication link, via centralized distribution by a polarization state information collection server, or a number of other suitable types of communication links.

In an alternative embodiment, analyzing unit 110 of the transmitter device 105 can calculate the first set of polarization state information based on a remote signal received at transmitter device 105. The term "remote signal" is used herein to describe a transmission signal that is received at a device. For example, and not limitation, the transmitter device 105 can receive a remote signal that propagated over a first wireless signal path 120. The analyzing unit 110 can then be utilized to analyze the received signal and determine the first set of polarization state information corresponding to signal propagation over this first wireless path. Therefore, the analyzing unit 110 can be enabled to analyze the specific polarization state characteristics of the first wireless signal path 120. By analyzing the received remote signal, in an exemplary embodiment, the analyzing unit 110 can be permitted to calculate the polarization state information pertinent to the specific first wireless signal path 120. Therefore, the analyzing unit 110 can determine the polarization mode dispersion experienced by the remote signal during propagation over the first wireless signal path 120.

In an exemplary embodiment, the remote terminal device 125 can be enabled to transmit the remote signal to the transmitter device 105. Therefore, in this exemplary embodiment, the remote terminal device 125 can enable real time information to be provided to the transmitter device 105 regarding the status of the first wireless signal path 120. For example, and not limitation, the remote terminal device 125 can be configured to regularly send remote signals to the transmitter device 105. In this particular embodiment, the transmitter device 105 can be configured to continually engage the analyzing unit 110 to determine polarization state information of each remote signal received. Furthermore, the adapting unit 115 can be configured to continually adapt transmission signals transmitted by the transmitter device 105 based on the most recent set of polarization state information created by the analyzing unit 110.

The ability to obtain real time polarization state information regarding the current status of a wireless signal path enables some of the most significant advantages of the present invention. Notably, the adapting unit 115 can modify signals to be transmitted by transmitter device 105 in accordance with real time information regarding the current condition of the wireless signal path 120. This is significant because the status of a wireless signal path 120 can vary greatly over time. Thus, polarization state information can quickly become inaccurate in estimating the adaptive polarization response associated with the transmit signal for a particular wireless signal path.

The adaptive polarization transmission system 100 provided in accordance with an exemplary embodiment of present invention, enables the real time exploitation of polarization mode dispersion and associated polarization dependent loss exhibited by a wireless signal transmission path. More particularly, the adapting unit 115 can pre-distort signals to be transmitted and thereby control the received signal polarization state of these transmission signals. Controlling the polarization state of the transmitted wireless signal can offer a number of potential benefits. First, the adaptive polarization transmission system 100 can enable signal power maximization with or without dispersion. Second, the adaptive polarization transmission system 100 can enable a wireless system to combat polarization-sensitive fading on a sub-band-by-subband basis through a judicious choice of the transmit polarization for each subband. Third, the adaptive polarization transmission system 100 can enable a wireless system to estimate the relative polarization-dependent subband signal power levels at the receiver for water-filling or bit-loading purposes. Fourth, the adaptive polarization transmission system 100 can enable a wireless system to minimize the signal's polarization mode dispersion at the receiver. Furthermore, the adaptive polarization transmission system 100 can provide range extension for a wireless system, signal separability enhancement, and interference mitigation.

In an exemplary embodiment, the adaptive polarization transmission system 100 is enabled to track and compare historical polarization state information in order to more effectively adapt transmission signals for improved reception. In an exemplary embodiment, the adaptive polarization transmission system 100 can maintain a log of the real time data concerning polarization state information achieved through calculations performed on remote signals received at the transmitter device 105. Those of skill in the art will appreciate that various tracking algorithms and procedures can be relied upon by the adaptive polarization transmission system 100 to implement this feature. For example, and not limitation, an exemplary embodiment of the adaptive polarization transmission system 100 can rely upon an implementation of a Kalman filtering algorithm. Therefore, the adaptive polarization transmission system 100 can leverage the ability to track, store, and compare real time polarization state information with that of stored polarization state information for a particular wireless signal path. Thereby, the predictive and analytical accuracy of the adaptive polarization transmission system 100 can be improved by continual processing and storing of real time data concerning the current status of a particular wireless signal path.

As shown in FIG. 1, the remote terminal device 125 in an exemplary embodiment can transmit a remote signal over the first wireless signal path 120 between the remote terminal device 125 and the transmitter device 105. Therefore, the analyzing unit 110 can estimate the specific polarization mode dispersion and polarization dependent loss experienced by signals propagating over first wireless signal path 120 between the transmitter device 105 and the remote terminal device 125. Additionally, the adapting unit 115 can adapt the transmission signals for optimized reception at the remote terminal device 125.

In an exemplary embodiment of the present invention, the transmitter device 105 communicates with numerous remote terminal devices. In this embodiment, the adaptive polarization transmission system 100 can estimate polarization state information for the wireless signal path between the transmitter device 105 and each individual remote terminal device. Therefore, the adaptive polarization transmission system 100 can adapt transmission signals according to the polarization state information estimated for each path to each specific remote terminal device 125.

In an exemplary embodiment of the present invention, the transmitter device 105 can include a variety of different antennas suitable for the transmission of a transmission signal with a predetermined polarization state. In an exemplary embodiment, the transmitter device 105 can provide a dual polarized antenna or an antenna consisting of orthogonally polarized elements that can be co-located or spatially separated. Similarly, the remote terminal device 125 can include a similar variety of antennas, including a dual polarized antenna or an antenna consisting of orthogonally polarized elements that can be co-located or spatially separated. As previously provided, the transmitter device 105 and the remote terminal device 125 in an exemplary embodiment can be implemented as transceiver devices capable of both sending an receiving signals.

In an exemplary embodiment, the adaptive polarization transmission system 100 of the present invention can adapt a transmission signal on a subband-by-subband basis. This exemplary embodiment is particularly effective for signaling modulation schemes that are easily divisible into subbands. Therefore, this exemplary embodiment is particularly effective for multi-carrier modulated signals. For example, and not limitation, in a wireless system using an Orthogonal Frequency-Division Multiplexing (OFDM) modulation scheme, the adaptive polarization transmission system 100 can enable adaptation of each subband of the OFDM wireless signal. Those of skill it the art will appreciate that the subband-by-subband adaptation ability of the adaptive polarization transmission system 100 can be applied to various signaling modulation schemes, including single carrier modulation schemes and multi-carrier modulation schemes. For example, and not limitation, the subband-by-subband adaptation ability of the adaptive polarization transmission system 100 can be applied to modulation schemes such as, but not limited to, those associated with code division multiple access (CDMA), space division multiple access (SDMA), orthogonal frequency division multiple access (OFDMA), and time division multiple access (TDMA) systems. Those of skill in the art will appreciate that the exemplary embodiment of the adaptive polarization transmission system 100 implemented for a single carrier modulation scheme can be enabled to account for polarization compensation across the subbands of the single carrier modulation scheme; thereby, enabling the demodulation of the polarization-compensated transmitted signal upon reception.

In an exemplary embodiment, the analyzing unit 110 of the adaptive polarization transmission system 100 can estimate the polarization state information for each subband of the OFDM wireless signal. Furthermore, the adapting unit 115 of this exemplary embodiment can pre-distort the polarization state of each subband of the OFDM wireless signal for optimized performance for each subband. Significantly, by adapting a transmission signal on subband-by-subband basis, the polarization state information can be more accurately exploited and polarization mode dispersion can be more accurately combated.

The subband-by-subband adaptation ability of the adaptive polarization transmission system 100 of the present invention provides significant advantages over the prior art. Significantly, polarization adaptation on a subband-by-subband basis is not possible with prior art systems. More particularly, the conventional polarization adaptation systems attempt to reduce polarization impairments by adapting to the full-bandwidth communication signal. In most instances, particularly for wider bandwidth signals common today, adaptation based on the modification of the entire full-band communication signal is ineffective and can actually create additional degradation in signal reception. Dividing a transmission signal into subbands permits the subbands to be more accurately analyzed as each subband exhibits minimal polarization variation across the subband.

In an exemplary embodiment of the present invention, the adaptive polarization transmission system 100 can be implemented in a Multiple Input Multiple Output (MIMO) wireless system. MIMO wireless systems can provide one or more wireless transceiver devices and receiver devices that have multiple antennas. The use of the multiple antennas enable the MIMO wireless systems to provide significant capability enhancement over single antenna systems. The diversity provided by multiple dual polarized antennas can increase the throughput and reliability of wireless communications. MIMO wireless systems can rely upon the use of multiple antennas and multiple signals to achieve high spectral efficiency, link reliability, and diversity. In an exemplary embodiment, the adaptive polarization transmission system 100 can be configured in a MIMO transceiver device to adapt the polarization of each of the multiple transmission signals independently. For example, the adapting unit 115 of the adaptive polarization transmission system 100 can be configured to pre-distort each output signal polarization independent of the other signals to be transmitted. Therefore, the adaptive polarization transmission system 100 in a MIMO transceiver device can rely upon polarization state information relevant to the multiple signals output by the MIMO transceiver device.

In an exemplary embodiment, the adaptive polarization transmission system 100 implemented in a MIMO wireless system and can be configured to calculate and analyze polarization state information from each antenna of the MIMO wireless system. More particularly, in this non-limiting example the MIMO wireless system can be implemented with two or more dual polarized antennas at each transceiver device in the MIMO wireless system. In this exemplary embodiment, the adaptive polarization transmission system 100 can be enabled to determine a preferred adaptation of each transmission signal based on the polarization state information received relevant to each antenna of the MIMO wireless system. In this non-limiting example, the adaptive polarization transmission system 100 could effectively pre-distort each individual transmission signal at each antenna to achieve benefits in terms of capacity, diversity, or reductions in receiver processing complexity.

Figure 2:
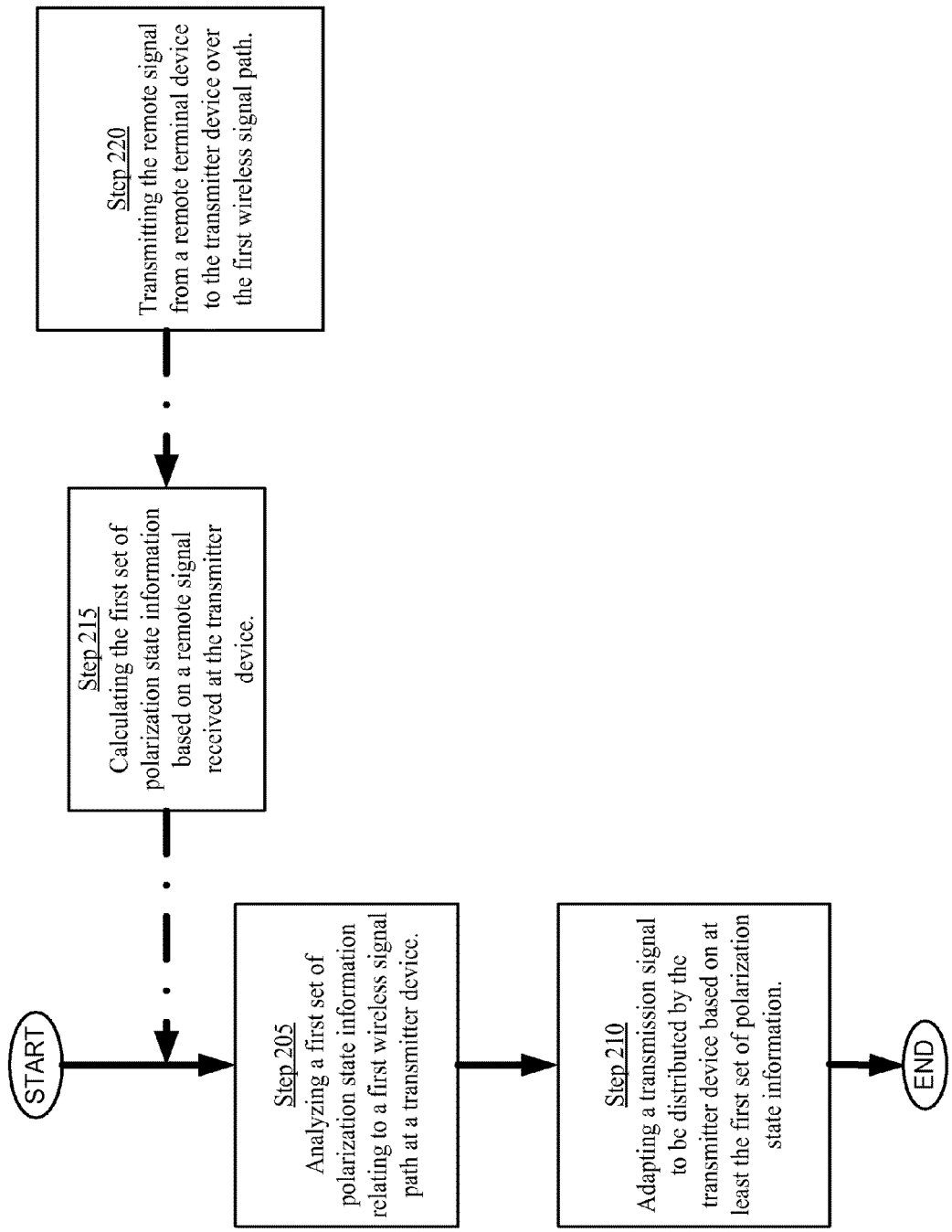
FIG. 2 provides an illustration of a block diagram of the method of adaptive polarization transmission 200 in accordance with an exemplary embodiment of the present invention.

FIG. 2 provides an illustration of a block diagram of the method of adaptive polarization transmission 200 in accordance with an exemplary embodiment of the present invention. As shown in FIG. 2, step 205 of the method of adaptive polarization transmission 200 provided by an exemplary embodiment of the present invention involves analyzing at a transmitter device a first set of polarization state information relating to a first wireless signal path.

In an exemplary embodiment, this first set of polarization state information can be provided from a variety of different sources. For example, and not limitation, polarization state information can be provided to the transmitter device 105. In one embodiment, the transmitter device 105 can receive the polarization state information from the remote terminal device 125. In this alternative embodiment, the remote terminal device 125 is enabled to perform the calculations to estimate the polarization state information of the relevant wireless signal path and communicate that polarization state information to the transmitter device 105.

Step 210 of the method of adaptive polarization transmission 200 involves adapting a transmission signal to be distributed by the transmitter device based on at least the first set of polarization state information. Specifically, step 210 in an exemplary embodiment, can involve pre-distorting the transmission signal to reduce polarization mode dispersion and polarization dependent loss. Therefore, transmission signals can be modified in step 210 to control the transmitted polarization in a way that yields desired signal characteristics at the receiver.

FIG. 2 also provides an illustration of a block diagram of the method of adaptive polarization transmission 200 in accordance with an alternative embodiment of the present invention. As shown in FIG. 2, the alternative embodiment of the method of adaptive polarization transmission 200 can begin with step 215. Step 215 involves calculating the first set of polarization state information based on a remote signal or other signals received at transmitter device. Therefore, in this alternative embodiment the polarization state information is not received from an external device, but rather the calculations to determine the polarization state information are performed at the transmitter device 105. Therefore, transmitter device 105 can receive the remote signal as input and then perform calculations on that remote signal to estimate the desired polarization state information with respect to that signal. Therefore, step 215 can involve calculating the set of polarization state information relevant to a specific received remote signal. Subsequently, the method of adaptive polarization transmission 200 can involve step 205, analyzing the polarization state information calculated in step 215, and step 210, adapting the transmission signal to be transmitted over the wireless signal path.

FIG. 2 also illustrates yet another alternative embodiment in which the remote terminal device 125 transmits the remote signal to the transmitter device 105. More particularly, step 220 of the method of adaptive polarization transmission 200 in this alternative embodiment involves transmitting the remote signal from a remote terminal device 125 to the transmitter device 105 over the wireless signal path of interest. Therefore, in this alternative embodiment, step 215 of the method of adaptive polarization transmission 200 can involve calculating the polarization state information for a remote signal that actually propagated over the wireless signal path of interest. Thereby, the calculations with respect to polarization mode dispersion exhibited over that wireless signal path can be accurately estimated. Furthermore, the step 210 of adapting the transmission signal can be effectively carried out based on these accurate estimations to reduce such polarization mode dispersion and associated polarization dependent loss.

Those of skill in the art will appreciate that the polarization state information relied upon by the various embodiments of the adaptive polarization transmission system 100 and method of adaptive polarization transmission 200 can be calculated in variety of different ways. In an exemplary embodiment, the wireless transmission signal propagating over the wireless signal path of interest can be analyzed as a vector and broken down into polarized components. Importantly, polarization mode dispersion can be accurately modeled and estimated in the frequency domain. Therefore, wireless signaling techniques that employ subbanding are well suited to efficiently leverage processing associated with the polarization mode dispersion estimation. For example, OFDM wireless signaling networks rely upon subbanding and, thus, can be accurately modeled and benefited by the adaptive polarization transmission system 100 and method of adaptive polarization transmission 200 of the present invention.

Figure 3:
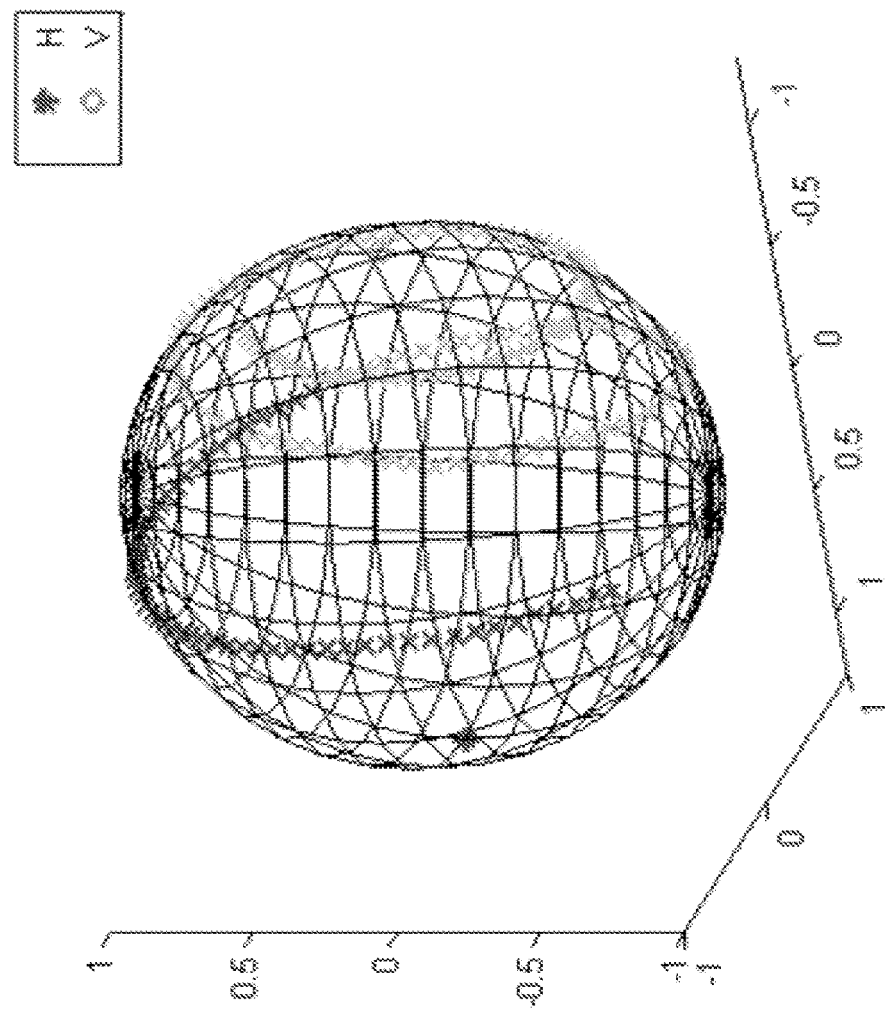
FIG. 3 provides an illustration of the polarization mode dispersion experienced by an OFDM wireless transmission signal in accordance with an exemplary embodiment of the present invention.

FIG. 3 provides an illustration of the polarization mode dispersion experienced by an OFDM wireless transmission signal in accordance with an exemplary embodiment of the present invention. At the transmitter, the polarization states of the subbands are identical. In wireless signal paths with polarization-diverse multipath delay spreads, however, the polarization of the subbands at the receiver will generally no longer be identical. As shown FIG. 3, the subbands will collectively exhibit polarization mode dispersion, or a spreading of polarization across the subbands. FIG. 3 illustrates on the Poincare sphere the polarization mode dispersion exhibited by a OFDM wireless transmission signal with a bandwidth around 18 MHz. The initial polarization states of the linearly polarized transmission signal are represented in FIG. 3 by the marker "*" for the horizontal (H) component and "○" for the vertical (V) component. The remaining "x" markers shown on the Poincare sphere in FIG. 3 correspond to resulting horizontal polarization components and vertical polarization components after the transmission signal has been subject to the polarization mode dispersion of the wireless signal path. The output polarization states shown in FIG. 3 vary as a function of frequency. In accordance with the present invention, the various embodiments of the adaptive polarization transmission system 100 and method of adaptive polarization transmission 200 enable this frequency dependent phenomenon to be modeled and its impact reduced through intelligent compensation.

In an exemplary embodiment, the adaptive polarization transmission system 100 employs a block modulation scheme to model an OFDM wireless transmission signal. In an exemplary embodiment, the block modulation scheme involves the parallel transmission of data symbols using orthogonal subcarriers and can by implemented with the Fast Fourier Transform ("FFT"), where the Inverse Fast Fourier Transform ("IFFT") is used as the modulator and the FFT is used as the demodulator. In an exemplary embodiment, the block modulation scheme assumes a block of N serial data symbols, with symbol duration $T_s$ and block duration $T=NT_s$, where $\underline{x}_n = \lfloor x_{n,0}\ x_{n,1}\ \ldots\ x_{n,N-1} \rfloor$ denotes the data symbol block. The complex envelope of the OFDM wireless transmission signal may be represented by:

$$s(t) = A \sum_n b(t - nT, \underline{x}_n)$$

where $$b(t, \underline{x}_n) = h_a(t) \sum_{k=0}^{N-1} x_{n_k} \exp\left\{ j \frac{2\pi\left(k - \frac{N-1}{2}\right)t}{T} \right\}$$

With block index n and shaping pulse $h_a(t)$. The frequency offset exp $$\left\{ -j \frac{\pi(N-1)t}{T} \right\}$$

centers the band-pass signal about the carrier frequency.

Additionally, the block modulation scheme relies upon Jones vectors to represent the polarization state of the transmitted signal associated with subband k in each block via the unit vector $x_k = [x_k^V\ x_k^H]^T$, where the block index n has been dropped and $x_k^V$ and $x_k^H$ represent the normalized vertically-(V) and horizontally-(H) polarized components of $x_k$. In an exemplary embodiment of the block modulation scheme, V and H are selected as the orthogonal basis polarizations.

With the OFDM wireless transmission signal represented in vertically (V) and horizontally (H) polarized components, a vector channel transfer function for subband k can be described by the following Mueller transmission matrix, the contents of which we refer to as polarization state information:

$$T_k = \begin{bmatrix} T_k^{VV} & T_k^{HV} \\ T_k^{VH} & T_k^{HH} \end{bmatrix}$$

After propagation through the channel, the polarization state of subband k at the receiver on the remote is represented by $$y_k = \begin{bmatrix} y_k^V \\ y_k^H \end{bmatrix} = \alpha_k T_k \begin{bmatrix} x_k^V \\ x_k^H \end{bmatrix}$$

where $\alpha_k$ is a normalization constant to yield a Jones vector with unit norm for the received remote signal.

In an exemplary embodiment, the transmission matrix, $T_k$, can provide the necessary polarization state information required by the adaptive polarization transmission system 100 or method of adaptive polarization transmission 200. The polarization state information can be used by the adaptive polarization transmission system 100 or in the method of adaptive polarization transmission 200 to achieve more efficient and effective transmissions to a receiver by controlling the transmitted polarization in a way that yields desired signal characteristics at the receiver.

Figure 4:
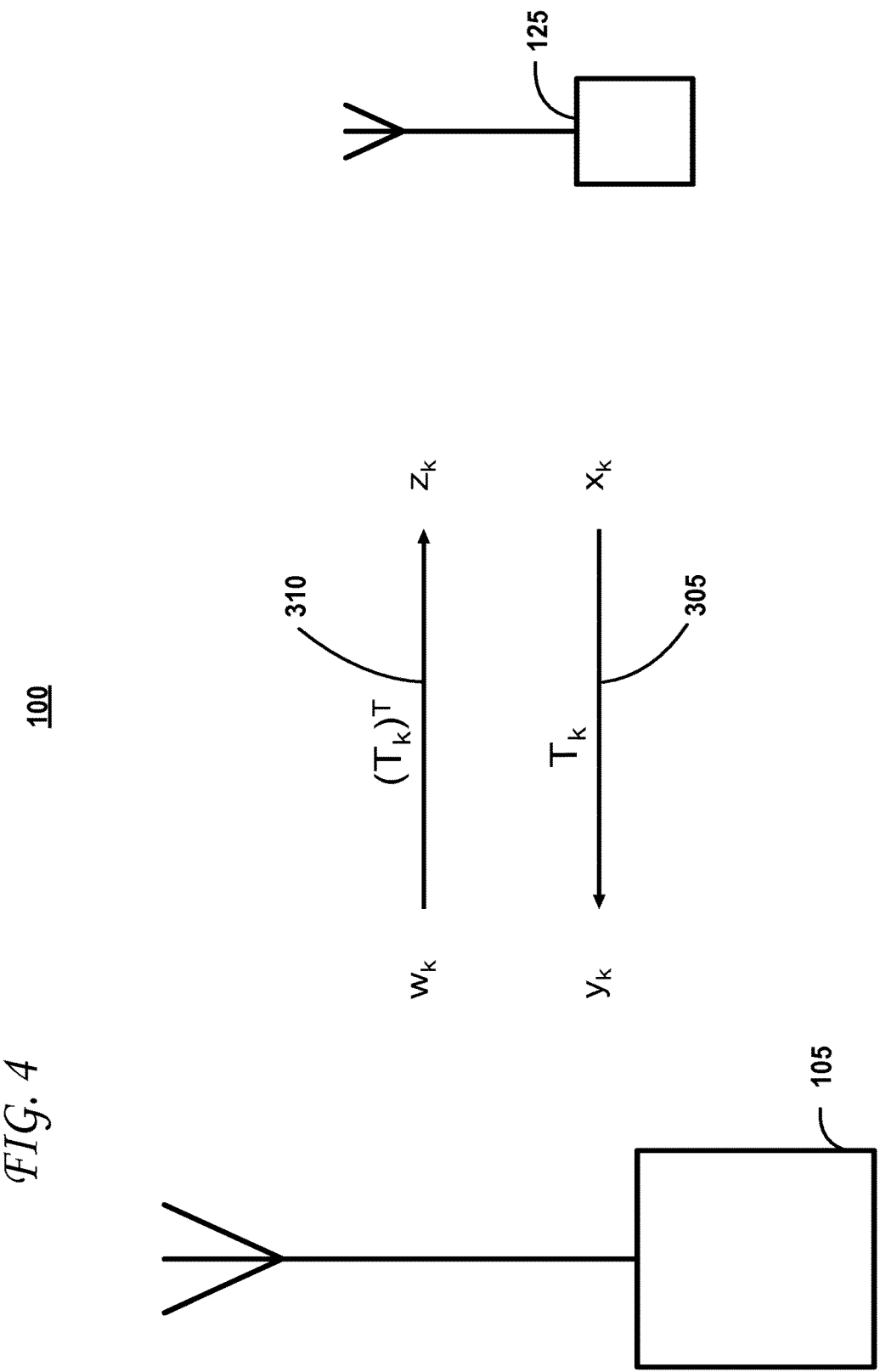
FIG. 4 provides a model of signal flow in a reciprocal wireless signal path in accordance with an exemplary embodiment of the present invention.

FIG. 4 provides a model of signal flow in a reciprocal wireless signal path in accordance with an exemplary embodiment of the present invention. In the exemplary embodiment shown in FIG. 4, the transmitter device 105 can receive a remote signal 305 from a remote terminal device 125. The remote signal 305 leaving the remote terminal device can be represented as $x_k$, in accordance with the block modulation scheme provided above. Furthermore, the remote signal 305 received at the transmitter device 105, which has been subject to the polarization mode dispersion in the wireless signal path between the remote terminal device 125 and the transmitter device 105, can be represented as $y_k$, in accordance with the block modulation scheme provided above. In an exemplary embodiment, the transmitter device 105 can implement the adaptive polarization transmission system 100 to calculate the transmission matrix, $T_k$, to derive the necessary polarization state information regarding the wireless signal path of interest. In an exemplary embodiment, the transmitter device 105 can implement the adaptive polarization transmission system 100 to pre-distort the transmitted transmission signal 310, represented as $w_k$ at the output of the transmitter device 105, such that after passing through the wireless signal path, the received signal subband polarization states, $z_k$, exhibit improved signal characteristics.

Those of skill in the art will appreciate that these improved signal characteristics can vary according to the requirements for a particular implementation. In one embodiment, the transmission signal 310 can be pre-distorted such that it exhibits zero dispersion at reception. In an alternative embodiment, transmission signal 310 can be pre-distorted such that it exhibits or maximum/minimum power at the remote terminal device 125. The embodiment also allows for independent control of multiple simultaneous signals such as might be employed for MIMO polarization multiplexing.

In a non-limiting example, a specific wireless signal path can be analyzed. Table 1 below provides the parameters for a contrived wireless signal path.

TABLE 1

| Propagation Parameter Values | | | | |
|---|---|---|---|---|
| Input Polarization Component | Gain | Reflected Polarization | Relative Delay | Phase |
| V | 0.2 | $\begin{bmatrix} 1 \\ 0 \end{bmatrix}$ | 0 | 0 |
| V | 0.543 | $\begin{bmatrix} 0.6e^{j4.08} \\ 0.8 \end{bmatrix}$ | 89 ns | 0 |
| H | 0.1 | $\begin{bmatrix} 0 \\ 1 \end{bmatrix}$ | 0 | 0 |
| H | 0.277 | $\begin{bmatrix} 0.97e^{j3.56} \\ 0.22 \end{bmatrix}$ | 181 ns | 0 |

In an exemplary embodiment, the three different input transmit states of polarization, Vertical (V), Horizontal (H), and Slant-45 (S45), are propagated in a wireless transmission signal across the wireless signal path described in Table 1.

Figure 5:
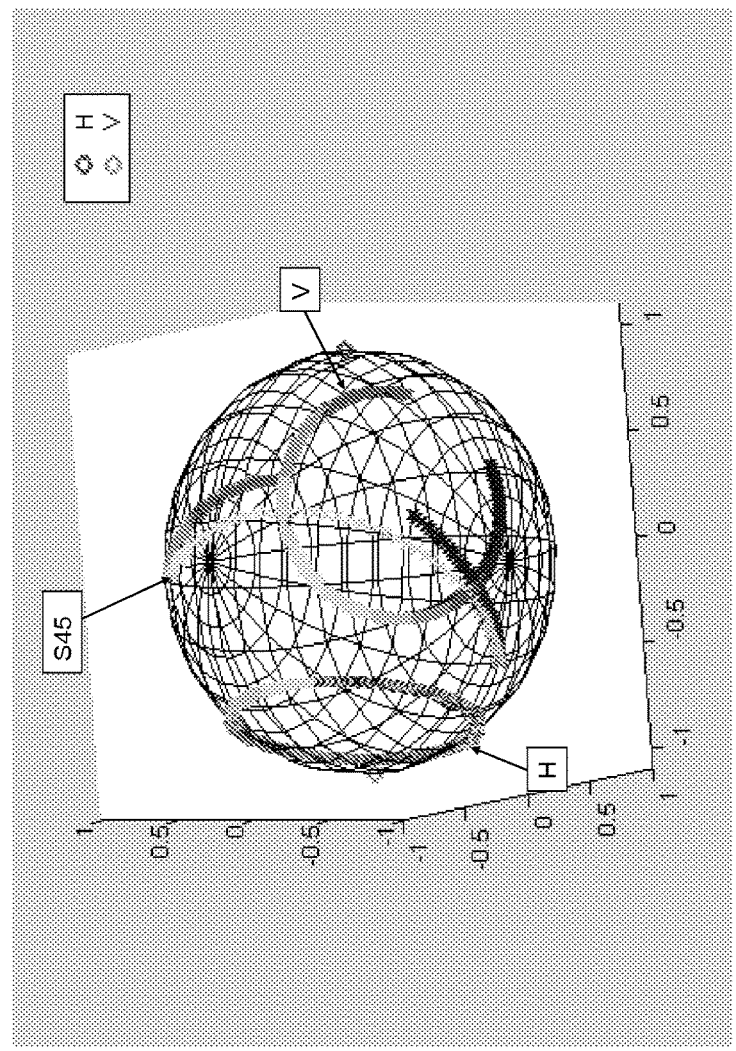
FIG. 5 provides an illustration of the resulting polarization dispersion associated with the wireless signal path channel conditions described in Table 1 in accordance with an exemplary embodiment of the present invention.

FIG. 5 provides an illustration of the resulting polarization dispersion associated with the wireless signal path channel conditions described in Table 1 in accordance with an exemplary embodiment of the present invention. More particularly, the Poincare sphere shown in FIG. 5 provides the resulting PMD trajectories associated with the channel conditions for the wireless signal path described in Table 1. FIG. 5 illustrates the resulting trajectory for each of the input transmit states of polarization, Vertical (V), Horizontal (H), and Slant-45 (S45).

In accordance with an exemplary embodiment of the present invention, the block modulation scheme can be implemented by the adaptive polarization transmission system 100 to estimate the polarization state information associated with the wireless signal path channel conditions described in Table 1. Specifically, polarization state information can be estimated for each subband of the transmission signal. For example and not limitation, the subband k=50 can be characterized by the following transmission matrix:

$$T_k = \begin{bmatrix} 0.48e^{-j0.52} & 0.27e^{j0.0636} \\ 0.4337e^{j1.37} & 0.047e^{j0.4806} \end{bmatrix}$$

In an exemplary embodiment, adaptive polarization transmission system 100 can rely upon the transmission matrix, $T_k$, for subband k=50 as the polarization state information. Therefore, the analyzing unit 110 of adaptive polarization transmission system 100 can retrieve the polarization state information contained in the transmission matrix, $T_k$, for subband k=50 and provide it to the adapting unit 115. Subsequently, the adapting unit 110 can be enabled to pre-distort subband k=50 of a transmission signal to compensate for the polarization mode dispersion exhibited by the wireless signal path channel conditions described in Table 1. Similarly, the adaptive polarization transmission system 100 can be enabled to activate the analyzing unit 110 and the adapting unit 115 to iteratively perform similar adaptations on the remaining subbands of a transmission signal.

The adaptive transmission techniques enabled by the adaptive polarization transmission system 100 and method of adaptive polarization transmission 200 embodiments of the present invention permit the prediction of the output dispersion patterns on the Poincare sphere as a function of the input polarization state and signal bandwidth. Adaptation of wireless transmission signals based on these predictions can achieve advantageous effects at the receiver, including zero dispersion, maximum and minimum power coupling with zero dispersion, and maximum and minimum power coupling without regard for zero dispersion. Exemplary embodiments of implementations targeting these three advantages are discussed below. Those of skill in the art will appreciate that these are simply three exemplary applications and many other advantages are possible with varying implementations of the adaptive polarization transmission system 100 or method of adaptive polarization transmission 200.

Controlled Polarization with Zero Dispersion

In an exemplary embodiment, the adapting unit 115 of the adaptive polarization transmission system 100 can adapt a transmission signal to present the remote terminal device 125 with a signal of uniform polarization across all subbands. Therefore, the adaptive polarization transmission system 100 can enable polarization dispersion reduction, interference avoidance, and signal separability enhancement. In accordance with an exemplary embodiment of the adaptive polarization transmission system 100, an adapting unit 115 can adapt the transmission signal on a subband-by-subband basis in accordance with a first set of polarization state information such that nominally zero dispersion is exhibited when the signal is received at the remote terminal device 125. For example, and not limitation, to achieve an arbitrary desired subband signal polarization $z_k=[V_D \, H_D]^T$ on the transmission signal at remote terminal device 125, the appropriate transmission signal polarization $[w_k^V \, w_k^H]^T$ can be computed via:

$$w_k^H = \psi_k \left[ \frac{T_k^{HV} V_D - T_k^{VV} H_D}{T_k^{HV} T_k^{VH} - T_k^{HH} T_k^{VV}} \right]$$

and $$w_k^V = \psi_k \left[ \frac{V_D}{T_k^{VV}} - \frac{T_k^{VH}}{T_k^{VV}} \left( \frac{T_k^{HV} V_D - T_k^{VV} H_D}{T_k^{HV} T_k^{VH} - T_k^{HH} T_k^{VV}} \right) \right] = \psi_k \left[ \frac{T_k^{VH} H_D - T_k^{HH} V_D}{T_k^{HV} T_k^{VH} - T_k^{HH} T_k^{VV}} \right]$$

where $\psi_k$ is a normalization factor such that $$\psi_k^{-1} = \sqrt{\left[ \frac{V_D}{T_k^{VV}} - \frac{T_k^{VH}}{T_k^{VV}} \left( \frac{T_k^{HV} V_D - T_k^{VV} H_D}{T_k^{HV} T_k^{VH} - T_k^{HH} T_k^{VV}} \right) \right]^2 + \left[ \frac{T_k^{HV} V_D - T_k^{VV} H_D}{T_k^{HV} T_k^{VH} - T_k^{HH} T_k^{VV}} \right]^2}$$

The received signal polarization on the transmitted signal can be described by the following:

$$\beta_k z_k = \beta_k \begin{bmatrix} z_k^V \\ z_k^H \end{bmatrix}$$

$$= T_k^T \begin{bmatrix} w_k^V \\ w_k^H \end{bmatrix}$$

$$= \psi_k \begin{bmatrix} T_k^{VV} & T_k^{VH} \\ T_k^{HV} & T_k^{HH} \end{bmatrix} \begin{bmatrix} \frac{V_D}{T_k^{VV}} - \frac{T_k^{VH}}{T_k^{VV}} \left( \frac{T_k^{HV} V_D - T_k^{VV} H_D}{T_k^{VH} T_k^{HV} - T_k^{HH} T_k^{VV}} \right) \\ \frac{T_k^{HV} V_D - T_k^{VV} H_D}{T_k^{VH} T_k^{HV} - T_k^{HH} T_w^{VV}} \end{bmatrix}$$

$$= \beta_k \begin{bmatrix} V_D \\ H_D \end{bmatrix}$$

Thereby, the received signal polarization state matches the intended desired polarization for all subbands. $\beta_k$ is a complex scale factor that can be introduced to retain a polarization state vector with unity norm and does not impact the polarization state.

Figure 6:
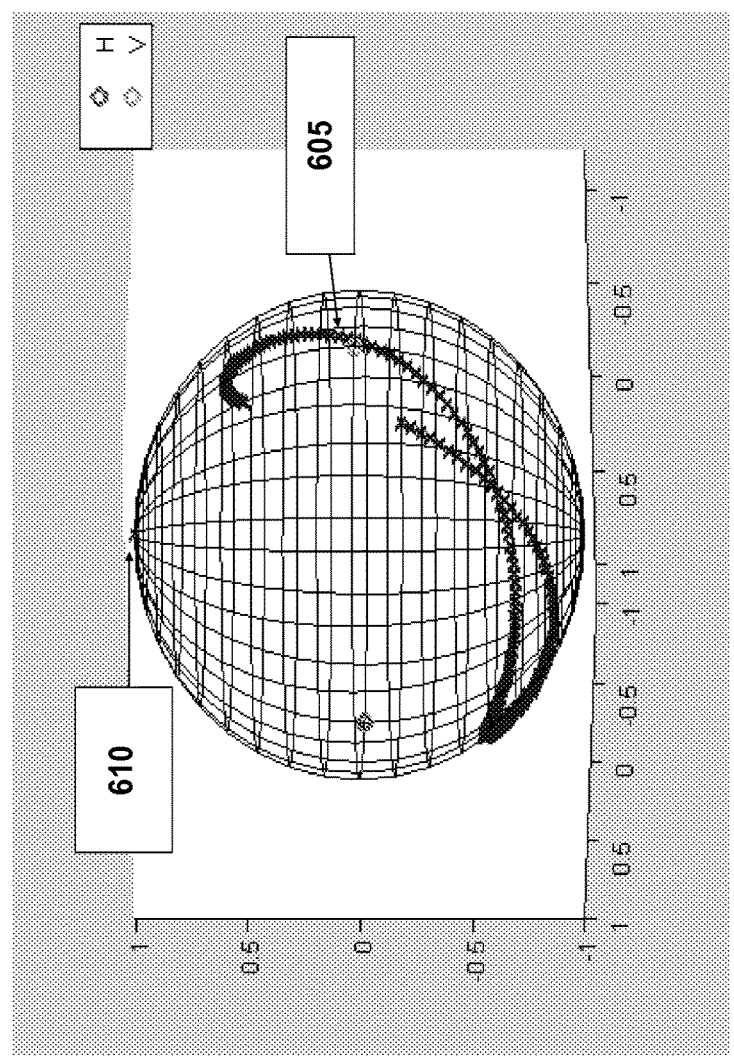
FIG. 6 provides an illustration of the compensated polarization state at the transmitter and the received polarization state of the transmission signal in accordance with a zero dispersion exemplary embodiment of the present invention.

FIG. 6 provides an illustration of the compensated polarization state at the transmitter and the received polarization state of the transmission signal in accordance with a zero dispersion exemplary embodiment of the present invention. As shown in FIG. 6, an exemplary embodiment of the adaptive polarization transmission system 100 can pre-distort the polarization state of a transmission signal to compensate for the polarization mode dispersion to be incurred during propagation over a given wireless signal path. The compensation trajectory 605 of the transmission signal adapted by the adapting unit 115 of the adaptive polarization transmission system 100 is shown on the Poincare sphere provided in FIG. 6. Additionally, the transmission signal received subband signal polarizations are concentrated at a single polarization state 610 at the top of the Poincare sphere in FIG. 6. As shown, the transmission signal received at the remote terminal device 125 exhibits a circular polarization with zero-dispersion. Those of skill in the art will appreciate that the tightness of the resulting polarization spread from the received transmission signal may be effected by the constraints from Signal to Noise Ratio ("SNR"), radio hardware reciprocity, and channel reciprocity and stationarity.

Maximum and Minimum Power Transfer Through the Channel with Zero Dispersion.

In an exemplary embodiment of the present invention, the method of adaptive polarization transmission 200 can maximize or minimize the power coupled from a transmitter device 105 to a particular remote terminal device 125 with the constraint that the subband polarizations of the received transmission signal exhibit zero dispersion. In an exemplary embodiment, the method of adaptive polarization transmission 200 achieves maximization and minimization by selecting $\hat{w}_k$ such that:

$$(\hat{w}_k)_{max} = \arg\underset{w_k}{\max}\left\{ \sum_k |\beta_k|^2 \right\}$$

and $$(\hat{w}_k)_{min} = \arg\underset{w_k}{\min}\left\{ \sum_k |\beta_k|^2 \right\}$$

Figure 7:
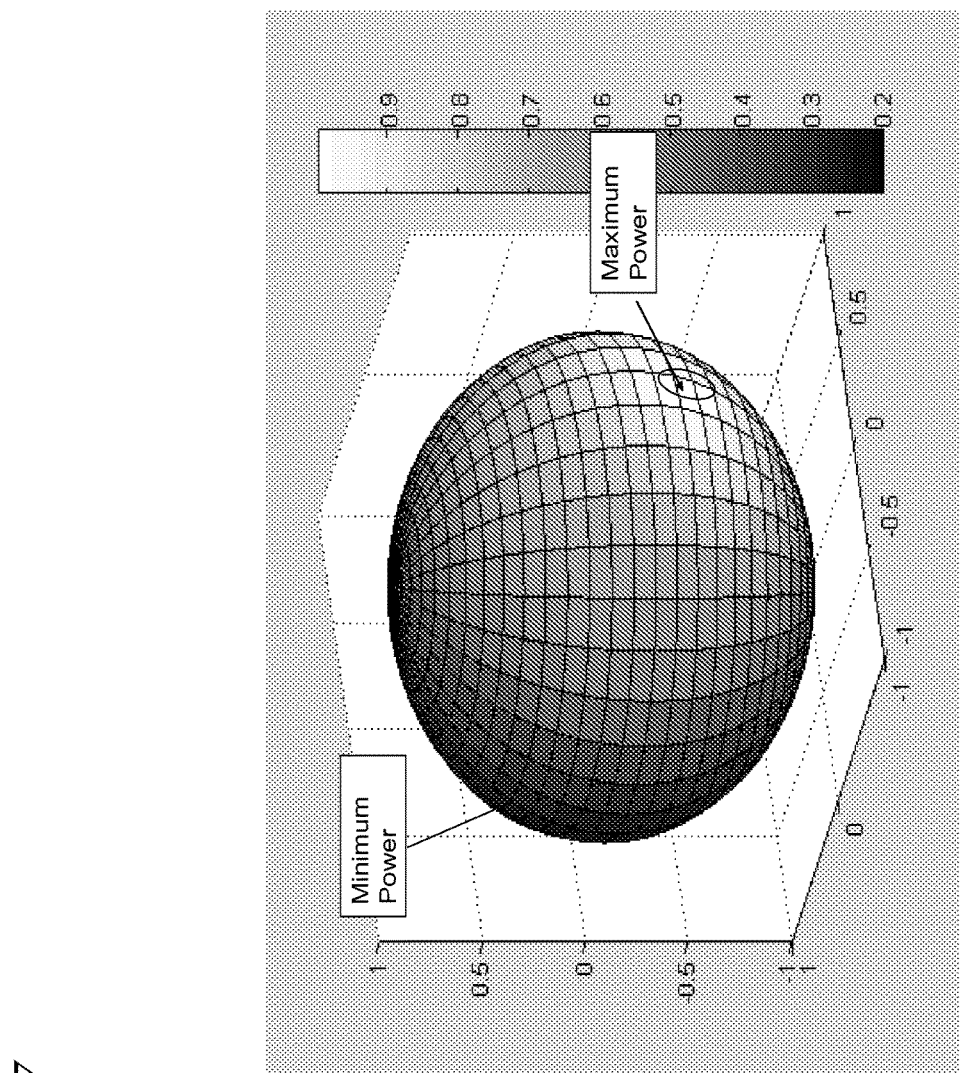
FIG. 7 provides an illustration of the relative power delivered by a received transmission signal as a function of the receive signal polarization, represented on a Poincare sphere, in accordance with an exemplary embodiment of the present invention.

FIG. 7 provides an illustration of the relative power delivered by a received transmission signal as a function of the receive signal polarization, represented on a Poincare sphere, in accordance with an exemplary embodiment of the present invention. The exemplary embodiment depicted in FIG. 7 corresponds to the channel conditions for the wireless signal path described in Table 1. For the wireless signal path described in Table 1, FIG. 7 illustrates the relative power of the received transmission signal coupled as a function of the output polarization state. As illustrated in FIG. 7, the exemplary embodiment of the method of adaptive polarization transmission 200 can yield a 7 dB increase in the total received power for the given wireless signal path channel conditions. Furthermore, for this exemplary embodiment the output polarization states corresponding to the maximum and minimum power coupling can be described as the following:

$$\begin{bmatrix} V_D \\ H_D \end{bmatrix}_{max} \doteq \begin{bmatrix} 0.97 e^{-j0.67} \\ 0.26 \end{bmatrix}$$

and $$\begin{bmatrix} V_D \\ H_D \end{bmatrix}_{min} \doteq \begin{bmatrix} 0.12 e^{-j2.67} \\ 0.99 \end{bmatrix}$$

Maximum and Minimum Power Transfer Through the Channel with Non-Zero Dispersion.

In an exemplary embodiment of the present invention, the method of adaptive polarization transmission 200 can maximize or minimize the power coupled from a transmitter device 105 to a particular remote terminal device 125, with no regard for the resulting polarization dispersion. For example, and not limitation, the method of adaptive polarization transmission 200 could be implemented to mitigate frequency-selective fading experience by a remote terminal device 125 through maximizing the power transfer allowed by the channel for each subband. Therefore, this exemplary embodiment of the method of adaptive polarization transmission 200 could provide range enhancement and/or improved bit error rate (BER) performance. In this exemplary embodiment, transmission matrix, $T_k$, can be used to estimate the polarization state information for each subband of a remote signal on a predefined wireless signal path. Thereby, the method of adaptive polarization transmission 200 can achieve the maximum and minimum power coupling for that subband on the transmission signal when the transmitted signal polarization associated with subband k is given by:

$$(w_k)_{max} = \arg\{\max_{w_k}(w_k' \Phi_k w_k)\}$$

and $$(w_k)_{min} = \arg\{\min_{w_k}(w_k' \Phi_k w_k)\},$$

respectively, where $\Phi_k = T_k^* T_k^T$, $(\cdot)'$ denotes the Hermitian operator, $(\cdot)^*$ indicates the conjugate, and $(\cdot)^T$ signifies the transpose. The transmitted polarization states that achieve these extremes are the eigenvectors of $\Phi_k$. It Those of skill in the art will appreciate that that the polarization states corresponding to these extremes are orthogonal at both the input and output of the channel for each of the subbands.

The maximum and minimum transmission coefficients corresponding to these transmission signal polarization states are given by the eigenvalues of $\Phi_k$, denoted $\lambda_{k,max}$ and $\lambda_{k,min}$. In terms of the Jones transmission matrix, $$T_k = C_k \begin{bmatrix} a & b \\ c & 1 \end{bmatrix},$$

the ratio of the maximum and minimum total received power can be given by the following:

$$P_k = \frac{\lambda_{k,max}}{\lambda_{k,min}}$$

$$= \frac{f + h + \sqrt{(f+h)^2 + 4(g - fh)}}{f + h - \sqrt{(f+h)^2 + 4(g - fh)}}$$

where $$f = |a|^2 + |b|^2; \; g = |a|^2|b|^2 + |c|^2 + d; \; h = 1 + |b|^2; \; d = 2\Re(a^*bc)$$

where $\Re(x)$ is the real part of x.

In an exemplary embodiment, the power ratio in decibels between the maximum and minimum power transfer through the wireless signal path can be described the following:

$$P_{k,dB} = 10\log_{10}\left(\frac{\lambda_{k,max}}{\lambda_{k,min}}\right) dB$$

Figure 8:
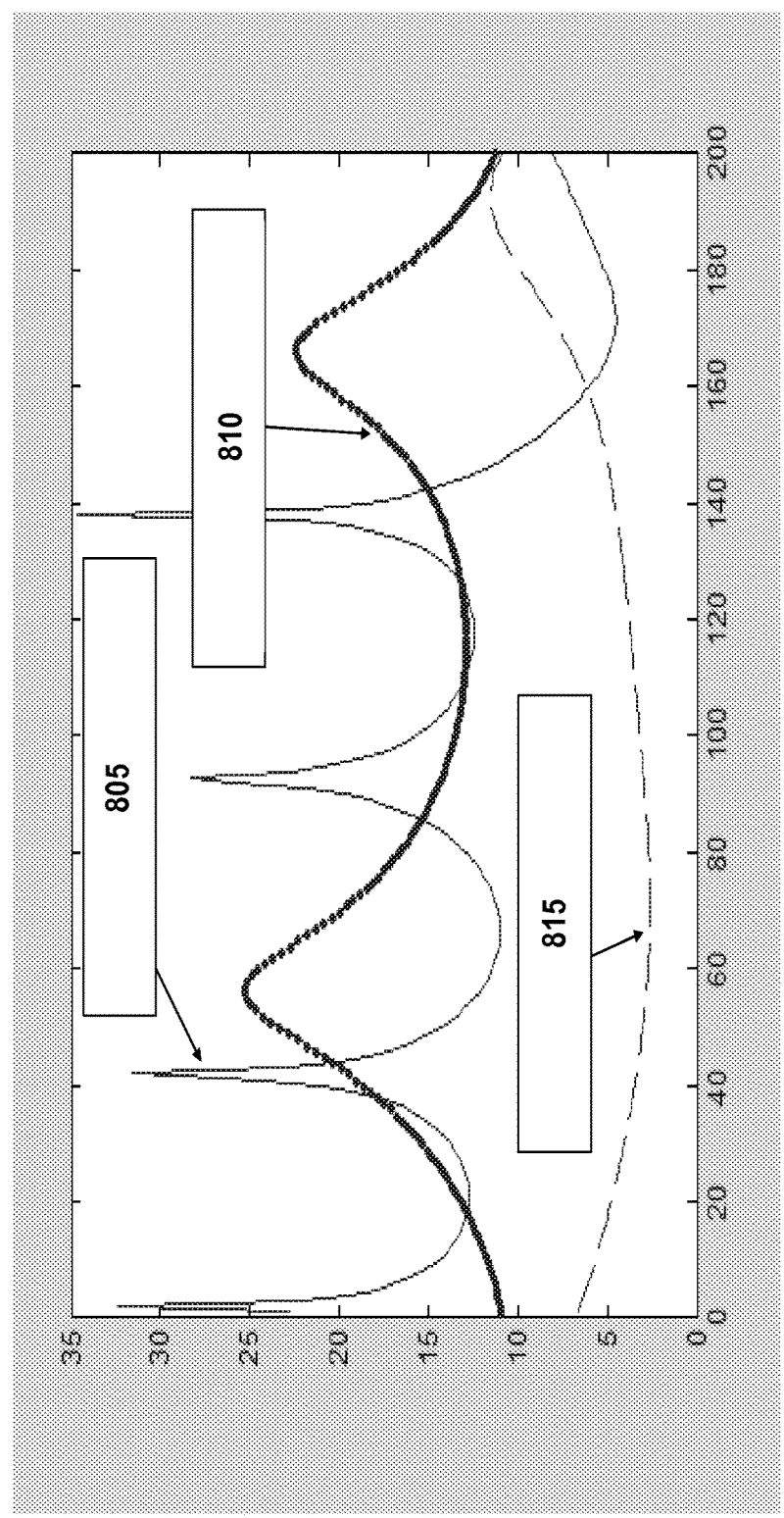
FIG. 8 provides a plot of the maximum and the minimum received powers for each subband of an OFDM transmission signal in accordance with an exemplary embodiment of the present invention.

FIG. 8 provides a plot of the maximum and the minimum received powers for each subband of an OFDM transmission signal in accordance with an exemplary embodiment of the present invention. For the exemplary embodiment depicted in FIG. 8, the power referred to corresponds to the total subband signal power collected by the dual-polarized receiver at a remote terminal device 125. Plot 805 provides an illustration of the transmission maximum and minimum subband power ratio. Additionally, plot 810 illustrates the ratios between the maximum received subband power and the received subband power in a vertical (V) single-polarized system. Furthermore, plot 815 illustrates the ratios between the maximum received subband power and the received subband power in an horizontal (H) single-polarized system. As illustrated by FIG. 8, the method of adaptive polarization transmission 200 of the present invention provides the ability to mitigate channel fading losses on a subband-by-subband basis. Additionally, the results shown in FIG. 8 also illustrate the possibility of water-filling or bit-loading, as the transmitter device 105 can use the polarization state information to readily estimate the relative subband signal powers that will be delivered at the remote terminal device 125.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of adaptive polarization transmission comprising:
   analyzing at a transmitter device a first set of polarization state information relating to a first wireless signal path; and
   adapting on a frequency subband-by-subband a transmission signal to be distributed by the transmitter device based on at least the first set of polarization state information;
   wherein adapting the transmission signal comprises:
      adapting a polarization of a first frequency subband of the transmission signal;
      adapting a polarization of a second frequency subband of the transmission signal differently than the polarization of the first frequency subband of the transmission signal.

2. The method of adaptive polarization transmission of claim 1 further comprising the step of calculating the first set of polarization state information based on a remote signal received at the transmitter device.

3. The method of adaptive polarization transmission of claim 2 further comprising the step of transmitting the remote signal from a remote terminal device to the transmitter device over the first wireless signal path.

4. The method of adaptive polarization transmission of claim 2, wherein the step of calculating the first set of polarization state information includes determining a transmission matrix.

5. The method of adaptive polarization transmission of claim 4, wherein the transmission matrix is defined based on the polarization states of the remote signal as a function of frequency subband.

6. The method of adaptive polarization transmission of claim 1, wherein the first set of polarization state information includes amplitude and phase measurements for signals transmitted over the wireless signal path in at least the first and second frequency subbands so that the polarization state information models the polarization mode dispersion exhibited by the first wireless signal path.

7. The method of adaptive polarization transmission of claim 6, wherein the step of adapting involves pre-distorting the transmission signal to achieve a desired result upon reception of the transmission signal.

8. The method of adaptive polarization transmission of claim 7, wherein the pre-distortion of the transmission signal compensates for the polarization mode dispersion exhibited by the first wireless signal path.

9. The method of adaptive polarization transmission of claim 7, wherein the desired result is zero dispersion.

10. The method of adaptive polarization transmission of claim 7, wherein the desired result is maximum power transfer.

11. The method of adaptive polarization transmission of claim 7, wherein the desired result is maximum power transfer with zero dispersion.

12. The method of adaptive polarization transmission of claim 7, wherein the step of adapting includes adapting at least a first subband of the transmission signal.

13. The method of adaptive polarization transmission of claim 12, wherein the step of adapting includes adapting a second subband of the transmission signal differently than the first subband of the transmission signal.

14. The method of adaptive polarization transmission of claim 12, wherein the transmission signal is a wireless multi-carrier modulated signal.

15. The method of adaptive polarization transmission of claim 12, wherein the transmission signal is a wireless single carrier modulated signal.

16. The method of adaptive polarization transmission of claim 1, wherein the step of adapting includes adapting a second transmission signal differently than the first transmission signal.

17. An adaptive polarization transmission system used to perform the method of claim 1 comprising:
the transmitter device of claim 1;
an analyzing unit included within the transmitter device for the processing of the first set of polarization state information relating to the first wireless signal path; and
an adapting unit included within the transmitter device for adapting the transmission signal to be distributed by the transmitter device based on at least the first set polarization state information.

18. The adaptive polarization transmission system of claim 17, wherein the analyzing unit is enabled to calculate the first set of polarization state information based on a remote signal received at the transmitter device.

19. The adaptive polarization transmission system of claim 18, wherein the transmitter device receives the remote signal from a remote terminal device, the remote signal propagating over the first wireless signal path.

20. The adaptive polarization transmission system of claim 19, wherein the first set polarization state information is dynamically updated based on an analysis of the remote signal most recently received at the transmitter device.

21. The adaptive polarization transmission system of claim 19, wherein the first set polarization state information regarding the first wireless signal path is real time information based on the current state of the first wireless signal path.

22. The adaptive polarization transmission system of claim 21, wherein the adapting unit is enabled to store and track the real time information based on the first wireless signal path.

23. The adaptive polarization transmission system of claim 18, wherein the analyzing unit calculates the first set of polarization state information by determining a transmission matrix.

24. The adaptive polarization transmission system of claim 23, wherein the transmission matrix is defined based on the polarization states of the remote signal as a function of frequency subband.

25. The adaptive polarization transmission system of claim 17, wherein the first set of polarization state information models the polarization mode dispersion exhibited by the first wireless signal path.

26. The adaptive polarization transmission system of claim 17, wherein the transmitter device includes a dual polarized antenna.

27. The adaptive polarization transmission system of claim 17, wherein the transmitter device includes two or more spatially separated dual polarized antennas.

28. The method of adaptive polarization transmission of claim 1 further comprising:
estimating the polarization mode dispersion exhibited by the first wireless signal path; and
pre-distorting the transmission signal to be distributed over the first wireless signal path by the transmitter device based on at least the estimated polarization mode dispersion.

29. A polarization mode dispersion estimation system used to perform the method of claim 28 comprising:
a monitoring device configured to receive the wireless transmission signal;
an analyzing unit included within the monitoring device for estimating the polarization mode dispersion exhibited by the wireless transmission signal and for generating the first set of polarization state information relating to the polarization mode dispersion; and
a communicating unit included within the monitoring device for providing the first set polarization state information to an external device.

30. The polarization mode dispersion estimation system of claim 29, wherein the external device is the transmitter device.

31. An adaptive polarization transmission system comprising:
a Multiple Input Multiple Output (MIMO) transceiver device;
an analyzing unit included within the MIMO transceiver device for processing a first set of polarization state information relating to a first wireless signal path, wherein the polarization state information includes amplitude and phase measurements for signals transmitted over the first wireless signal path in at least a first frequency subband and a second frequency subband so that the polarization state information is indicative of a polarization mode dispersion of the first wireless signal path; and an adapting unit included within the MIMO transceiver device for adapting a polarization of a first transmission signal to be distributed by the MIMO transceiver device based on at least the first set polarization state information and for adapting a polarization of a second transmission signal to be distributed by the MIMO transceiver device based on at least the first set polarization state information;

wherein adapting the polarization of the first transmission signal includes adapting a polarization of the first frequency subband of the first transmission signal and adapting a polarization of the second frequency subband of the first transmission signal differently than the polarization of the first frequency subband.

32. The adaptive polarization transmission system of claim 31, wherein the analyzing unit is enabled to calculate the first set of polarization state information based on a remote signal received at the MIMO transceiver device.

33. The adaptive polarization transmission system of claim 32, wherein the MIMO transceiver device receives the remote signal from a remote terminal device, the remote signal propagating over the first wireless signal path.

34. The adaptive polarization transmission system of claim 31, wherein adapting unit independently adapts a plurality of transmission signals in accordance with a desired result upon reception.

* * * * *